(12) United States Patent
Huynh et al.

(10) Patent No.: US 8,261,204 B1
(45) Date of Patent: Sep. 4, 2012

(54) METHOD AND SYSTEM FOR OBTAINING FORM DATA FROM A USER

(75) Inventors: Thanh Hang Nguyen Huynh, Irving, TX (US); Jorge R. Olavarrieta, Plano, TX (US); Eric Young Pan, San Diego, CA (US); Matthew G. Rice, San Diego, CA (US); Ronald G. Starling, II, San Diego, CA (US); Steven Karl Wheelis, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 806 days.

(21) Appl. No.: 12/363,628

(22) Filed: Jan. 30, 2009

(51) Int. Cl.
*G06F 3/048* (2006.01)
(52) U.S. Cl. .................. 715/780; 715/218; 715/221
(58) Field of Classification Search .................. 715/212, 715/214, 217, 218, 220–224, 503, 705, 780, 715/788, 808, 809, 904
See application file for complete search history.

(56) References Cited

U.S. PATENT DOCUMENTS

| | | | | |
|---|---|---|---|---|
| 5,999,182 | A * | 12/1999 | Etchemendy et al. | 715/853 |
| 6,983,423 | B2 | 1/2006 | Dvorak et al. | 715/781 |
| 6,990,480 | B1 * | 1/2006 | Burt | 1/1 |
| 7,117,431 | B2 * | 10/2006 | Robison et al. | 715/224 |
| 7,194,695 | B1 * | 3/2007 | Racine et al. | 715/780 |
| 7,240,028 | B1 * | 7/2007 | Rugge | 705/30 |
| 7,447,704 | B2 * | 11/2008 | Han et al. | 1/1 |
| 7,757,177 | B1 * | 7/2010 | Bohm et al. | 715/760 |
| 7,831,539 | B2 * | 11/2010 | Folting et al. | 707/600 |
| 7,840,979 | B2 * | 11/2010 | Poling et al. | 725/41 |
| 7,856,620 | B1 * | 12/2010 | Fleischer et al. | 717/109 |
| 8,001,155 | B2 * | 8/2011 | Danton et al. | 707/798 |
| 2004/0239683 | A1 * | 12/2004 | Chu et al. | 345/619 |
| 2006/0107196 | A1 * | 5/2006 | Thanu et al. | 715/503 |
| 2006/0174189 | A1 * | 8/2006 | Weitzman et al. | 715/503 |
| 2006/0287998 | A1 * | 12/2006 | Folting et al. | 707/5 |
| 2007/0050697 | A1 * | 3/2007 | Lewis-Bowen et al. | 715/503 |
| 2007/0130503 | A1 * | 6/2007 | Voshell | 715/504 |
| 2007/0157124 | A1 * | 7/2007 | Haug | 715/835 |
| 2010/0064252 | A1 * | 3/2010 | Kramer et al. | 715/810 |

OTHER PUBLICATIONS

Lacerte Educational Services, "Client Training CPE", Updated Seminar 1999 Edition, Copyright 1999, (7 Pages).

* cited by examiner

*Primary Examiner* — Weilun Lo
*Assistant Examiner* — Enrique Iturralde
(74) *Attorney, Agent, or Firm* — Osha Liang LLP

(57) ABSTRACT

A method for obtaining data from a user includes receiving a row selection in an input grid, where each column is associated with one of a plurality of primary input variables, and where each row is configured to display primary data corresponding with the plurality of primary input variables, receiving a request to expand the row to display an input form, where the input form comprises a plurality of fields, where each of the plurality of fields is associated with one of a plurality of supplementary input variables, and where the plurality of fields are configured to display supplementary data corresponding with the plurality of supplementary input variables. The method further includes expanding the row to display the input form, obtaining and storing supplementary data for the input form, collapsing the row to hide the input form, and displaying a summary of supplementary data stored for the input form.

23 Claims, 10 Drawing Sheets

METHOD AND SYSTEM FOR OBTAINING FORM DATA FROM A USER

BACKGROUND

Data, ranging from scientific to commercial in nature, is subject to a variety of uses aiding government, industry, and society at large to better perform their critical functions. Accordingly, a large number of these organizational entities are invested in the collection and storage of data. As data is predominantly stored using computer systems, a number of options are available for inputting the data into the computer system. Spreadsheets provide simple interface for data entry. Software wizards provide a sophisticated solution that is capable of querying and guiding a user through a more responsive data entry process.

SUMMARY

In general, in one aspect, the invention relates to a method for obtaining data from a user. The method includes receiving from the user a row selection in an input grid, where the input grid comprises at least one row and a plurality of columns, where each of the plurality of columns is associated with one of a plurality of primary input variables, and where each row is configured to display primary data corresponding with the plurality of primary input variables. The method further includes obtaining and storing primary data for a row corresponding with the row selection from the user, receiving from the user a request to expand the row to display an input form, where the input form comprises a plurality of fields, where each of the plurality of fields is associated with one of a plurality of supplementary input variables, and where the plurality of fields are configured to display supplementary data corresponding with the plurality of supplementary input variables. The method further includes expanding the row to display the input form. The method further includes obtaining and storing supplementary data for the input form from the user. The method further includes collapsing the row to hide the input form. The method further includes displaying, in association with the row, a summary of supplementary data stored for the input form.

In general, in one aspect, the invention relates to a system for obtaining data from a user. The system comprises a user interface, wherein the user interface comprises an input grid comprising at least one row and a plurality of columns, wherein each of the plurality of columns is associated with one of a plurality of primary input variables, and wherein each row in the input grid is configured to display primary data corresponding with the plurality of primary input variables. The user interface further comprises an input form comprising a plurality of fields, wherein each of the plurality of fields is associated with one of a plurality of supplementary input variables, and wherein the plurality of fields are configured to display supplementary data corresponding with the plurality of supplementary input variables. The user interface is configured to: receive, from the user, a row selection in the input grid; obtain primary data for a row corresponding with the row selection from the user; receive, from the user, a request to expand the row to display the input form; expand the row to display the input form; obtain supplementary data for the input form from the user; collapse the row to hide the input form; and display, in association with the row, a summary of supplementary data obtained from the input form. The system further comprises: a variable repository configured to store the plurality of primary input variables and the plurality of supplementary input variables in the initialization file; a data repository configured to store primary and supplementary data obtained from the user; and a control module configured to retrieve the plurality of primary input variables and the plurality of supplementary input variables from the variable repository, wherein the control module is further configured to create the input grid using the plurality of primary input variables and to create the input form using the plurality of supplementary input variables, and wherein the control module is further configured to route primary and supplementary data from the user interface to the data repository.

In general, in one aspect, the invention relates to computer readable medium comprising executable instructions for obtaining data from a user, wherein executable instructions comprise instructions to: obtain, from an administrator, a plurality of primary input variables and a plurality of supplementary input variables; store the plurality of primary input variables and the plurality of supplementary input variables; retrieve the plurality of primary input variables and the plurality of supplementary input variables; create an input grid using the plurality of primary input variables, wherein the input grid comprises at least one row and a plurality of columns, wherein each of the plurality of columns is associated with one of the plurality of primary input variables, and wherein each row is configured to display primary data corresponding with the plurality of primary input variables; receive, from the user, a row selection in the input grid; obtain and store primary data for a row corresponding with the row selection from the user; receive, from the user, a request to expand the row to display an input form, wherein the input form comprises a plurality of fields associated with one of the plurality of supplementary input variables, and wherein the plurality of fields are configured to display supplementary data corresponding with the plurality of supplementary input variables; expand the row to display the input form; obtain and store supplementary data for the input form from the user; collapse the row to hide the input form; and display, in association with the row, a summary of supplementary data stored for the input form.

Other aspects of the invention will be apparent from the following description and the appended claims.

DETAILED DESCRIPTION

Figure 1:
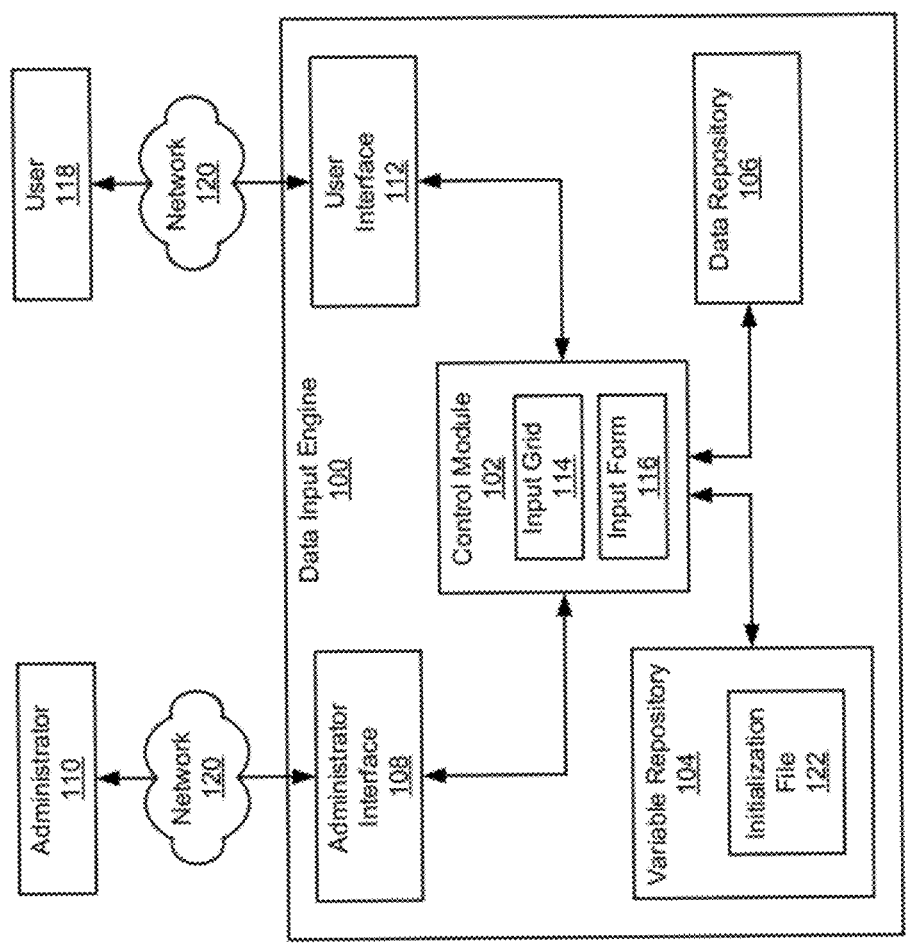
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for obtaining form data from a user. More specifically, embodiments of the invention obtain data using an input grid and an input form. In particular, embodiments of the invention allow for the specification of input variables used to determine the data obtained from users.

FIG. 1 shows a system in accordance with one or more embodiments of the invention. The system includes an administrator (110) (or more specifically, a computer system operated by an administrator), a user (118) (or more specifically, a computer system operated by a user), and a data input engine (100). In one or more embodiments of the invention, these system components (110, 118, 100) are operatively connected to each other over one or more wired or wireless networks (or any combination thereof).

In one or more embodiments of the invention, the administrator (110) is configured to receive a request sent over a network for one or more input variable specifications. In one or more embodiments of the invention, the administrator (110) is configured to send a response over the network specifying one or more input variables. In one or more further embodiments of the invention, this request-response exchange is facilitated using a graphical interface.

In one or more embodiments of the invention, the user (118) is configured to receive a request sent over a network for the submission of input data. In one or more embodiments of the invention, the user (118) is configured to send a response over the network providing input data. In one or more further embodiments of the invention, this request-response exchange is facilitated using a graphical interface.

In one or more embodiments of the invention, the data input engine (100) is configured to obtain input data from a user (118). In particular, the data input engine (100) is configured to send a request for input data and receive input data provided in response to the request. Further, the data input engine (100) is configured to send a request for input variable specifications, which the data input engine (100) receives from an administrator (110) in response to the request. Both input data and input variable specifications are stored by the data input engine (100) as they are received.

In one or more embodiments of the invention, the data input engine (100) includes, at least, a user interface (112), an administrator interface (108), a variable repository (104), a data repository (106), and a control module (102). Each of these components is described below.

In one or more embodiments of the invention, the user interface (112) is configured to present a graphical interface including an input grid (114) and an input form (116) to the user (118). The user interface (112) is further configured to receive input data from the user (118) through the input grid (114) and the input form (116) features (discussed below).

In one or more embodiments of the invention, the input grid (114) includes at least one row and a number of columns. Each of the columns in the input grid (114) is associated with a primary input variable. Each row in the input grid (114) is configured to display primary data corresponding with the primary input variables. Each row in the input grid (114) is further configured to receive primary data from the user (118).

In one or more embodiments of the invention, the input form (116) includes a number of fields. Each of the fields in the input form (116) is associated with a supplementary input variable. Each of the fields in the input form (116) is configured to receive and display supplementary data corresponding to a supplementary input variable.

In one or more embodiments of the invention, the primary data corresponds to data entered for one or more primary input variables of a larger set of input variables most often provided by a user. Supplementary data corresponds to data entered for one or more supplementary input variables from the larger set of input variables which the user provides less frequently. Those skilled in the art will appreciate that any of the input variables may be designated as a primary input variable or a supplementary input variable. Further, those skilled in the art will appreciate that the control module may track for which input variables the user provides data and dynamically adjust the variables that are considered primary input variables and supplementary input variables.

In one or more embodiments of the invention, the administrator interface (108) is configured to request and receive from an administrator (110) a specification of primary input variables and supplementary input variables.

In one or more embodiments of the invention, the variable repository (104) is configured to store the primary input variables and the supplementary input variables. In one or more embodiments of the invention, this information is stored in an initialization file.

In one or more embodiments of the invention, the data repository (106) is configured to store primary input data and supplementary input data obtained from the user (118).

In one or more embodiments of the invention, the variable repository (104) and the data repository (106) are implemented, in part, through the use of storage devices. Examples of storage devices may include, but are not limited to, random access memory, solid state memory, magnetic media, optical memory, any other type of storage medium, or any combination thereof.

In one or more embodiments of the invention, the control module (102) manages interaction between the user interface (112), the administrator interface (108), the variable repository (104), and the data repository (106). The control module (102) is further configured to use the primary and supplementary input variables to generate the input grid (114) and input form (116).

In one or more embodiments of the invention, the data input engine (100) is configured to execute on a computer having a storage device and operatively connected to a network. In one or more embodiments of the invention, the data input engine (100) is presented to the administrator and/or the user as a web service.

Figure 2:
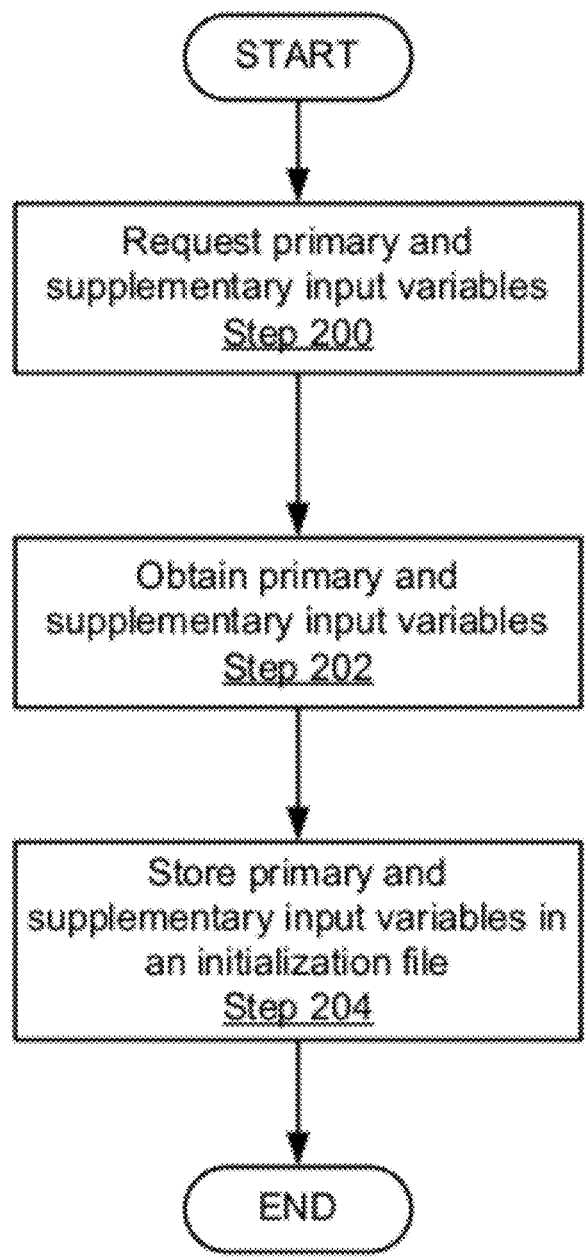
FIGS. 2 and 3 show flowcharts in accordance with one or more embodiments of the invention.
Figure 3:
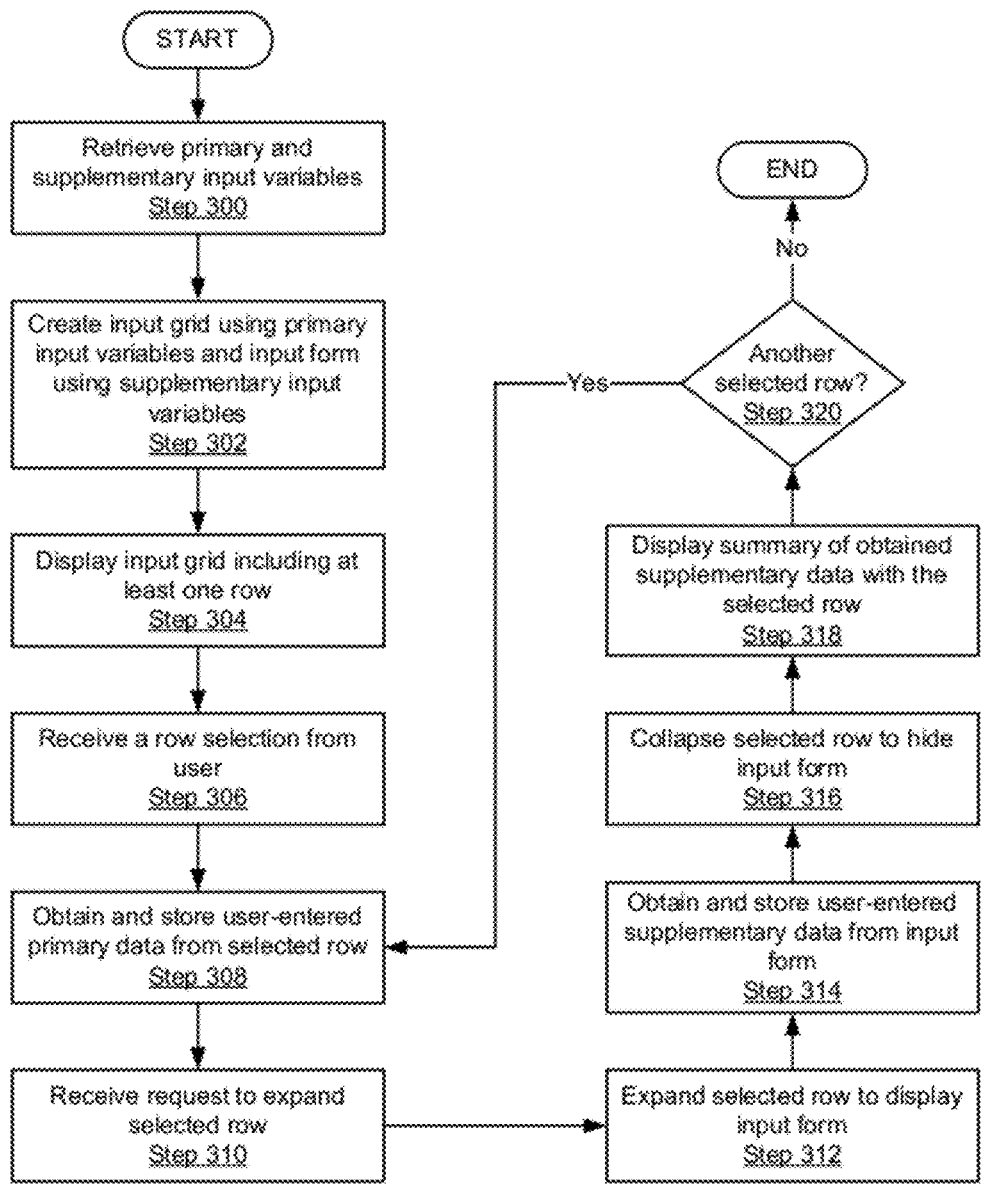

FIGS. 2 and 3 show flowcharts in accordance with one or more embodiments of the invention. While the various steps in these flowcharts are presented and described sequentially, one should appreciate that some or all of the steps may be executed in different orders, may be combined or omitted, and some or all of the steps may be executed in parallel. In addition, steps have been omitted to simplify the presentation.

The process shown in FIG. 2 may be used, for example, to allow specification of input variables by an administrator through an administrator interface. In Step 200, a request for primary and supplementary input variables is issued. In Step 202, primary and supplementary input variables are received in response. In one or more embodiments of the invention, the administrator may specify a subset of the supplementary input variables to be used for purposes of displaying a summary of supplementary data to the user (discussed below). In Step 204, the obtained primary and supplementary input variables are stored in the variable repository. In one or more embodiments of the invention, the primary and supplementary input variables are stored in an initialization file.

The process shown in FIG. 3 may be used, for example, by a data input engine to obtain data from a user. In Step 300, primary input variables and supplementary input variables, specified in Step 202, are retrieved from the variable repository.

In Step 302, the primary input variables and the supplementary input variables are respectively used to create the input grid and input form features of the user interface. With regards to the input grid, each one of the primary input variables is associated with a column in the input grid. With regards to the input form, each one of the supplementary input variables is associated with a field in the input form.

In Step 304, the input grid, having at least one row, is displayed via the user interface. In one or more embodiments of the invention, when there is no existing data stored in the data repository, the input grid initially contains a blank row configured to display primary data from the user. In one or more embodiments of the invention, when there is existing data, the input grid includes rows displaying primary data previously obtained from the user and stored in the data repository. Each row may further display a summary of supplementary data in association with the row, if supplementary data had been previously obtained from the user in association with the row.

In those instances, when there is existing data, the following two steps, not shown in FIG. 3, typically precede Step 304. In the first step, not shown, the existing and previously-obtained primary data and supplementary data from the data repository are retrieved. In a second step, not shown, a summary is created and displayed for those rows in the input grid for which there is supplementary data. When specified by an administrator, a subset supplementary input variables is used in this second step to select which supplementary data to display. In the alternative, when the administrator has not specified a subset of supplementary input variables, the entirety of the obtained supplementary data is provided in the summary. In another alternative, when the administrator has not specified a subset of supplementary input variables, a default subset of the supplementary input variables is used to generate the summary.

Returning to FIG. 3, in Step 306, the user selects a row from the input grid. In one or more embodiments of the invention, the row may be a blank row or, alternatively, a populated row including primary data previously obtained from the user. In Step 308, primary data entered by the user is obtained from the selected row and then stored in the data repository. In instances where the selected row is a blank row, the primary data obtained in this step is used to generate a new data entry. In other instances where the selected row is a populated row containing previously-obtained primary data, the primary data obtained in this step is used to update an existing data entry.

In Step 310, the user issues a request, via the user interface, to the control module to expand the selected row. In one or more embodiments of the invention, a control object is associated with each row in the input grid and configured to receive a request issued by the user to expand the row. A control object is a visual feature of a user interface with which the user can directly interact. Examples of control objects may include, but are not limited to, push button controls, radio button controls, and check box controls.

In Step 312, in response to request in Step 310, the selected row expands to display the input form. As such, in one or more embodiments of the invention, the input form is displayed spatially adjacent to the selected row in the input grid. In Step 314, supplementary data entered by the user is obtained using the input form and then stored in the data repository. In Step 316, the selected row is collapsed to hide the input form. In one or more embodiments of the invention, a control object is associated with an expanded row in the input grid and configured to receive a request to collapse the row.

In Step 318, a summary of the obtained supplementary data is displayed in association with the selected row in the input grid. As such, in one or more embodiments of the invention, the summary of the obtained supplementary data is displayed spatially adjacent to the selected row in the input grid. In one or more embodiments of the invention, the summary includes all the supplementary data obtained from the user using the input form. Alternatively, in one or more other embodiments of the invention, the summary includes a subset of all the supplementary data obtained from the user using the input form. In such cases, this subset of all the supplementary data is determined as a function of a subset of supplementary input variables specified by the administrator and maintained in an initialization file by the variable repository.

In Step 320, the data input engine determines whether another row is selected by the user for data entry. If another row is selected by the user, then Steps 308 through 318 are repeated for that data entry. Otherwise, the process of obtaining data from the user idles until a next row is selected by the user.

FIGS. 4a-4f show screenshots in accordance with one or more embodiments of the invention. Together they serve to provide a detailed illustration of the manner in which data is obtained from a user under one or more embodiments of the invention. However, the screenshots shown in FIGS. 4a-4f are provided as an example and are not intended to limit the scope of the invention.

Figure 4A:
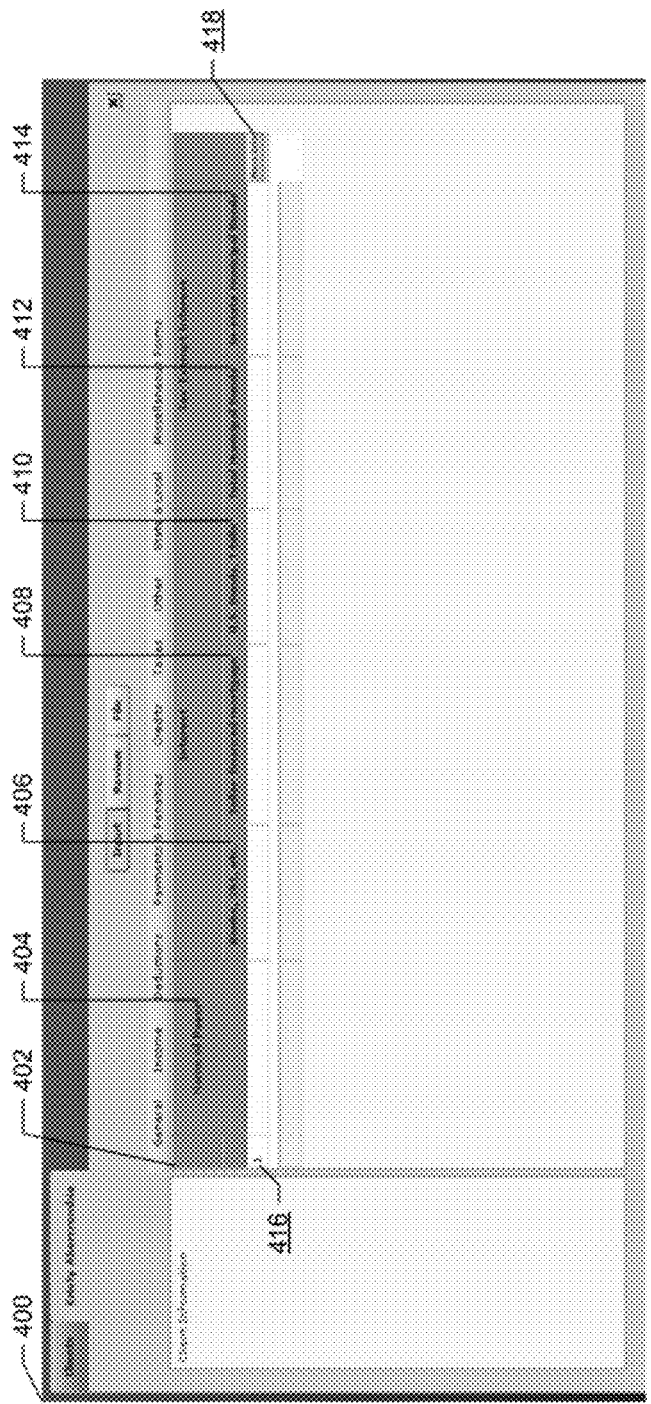
FIGS. 4a-4f show screenshots in accordance with one or more embodiments of the invention.

Referring to the Figures, FIG. 4a shows the user interface (400) for a data input engine. The user interface (400) includes an input grid (402) with one row (416) and six columns (404-414), where each of the columns is associated with one of six primary input variables. In this case, the primary input variables are: "Name of Payer" (404); "Interest"/"Banks, S&L, etc." (406); "Interest"/"Seller-financed mortgage" (408); "Interest"/"U.S. Bonds, T-bills" (410); "Tax-Exempt Interest"/"Total Municipal Bonds" (412); and "Tax-Exempt Interest"/"In-state Municipal Bonds" (414).

The six primary input variables, along with a number of supplementary input variables (not shown), are specified by an administrator using an administrator interface and stored in the variable repository. For purposes of formatting the input grid (402), and more specifically defining the columns (404-414) of the input grid (402), the control module retrieved the primary input variables from the variable repository.

The control module typically also retrieves, from a data repository, primary and supplementary data previously obtained from the user for purposes of populating the input grid (402) accordingly. In this case, no primary and supplementary data was previously obtained from the user and, as such, the input grid (402) does not include any populated row entries. Instead, only a single blank row (416) is presented in the input grid (402).

Further, in association with the row (416), the user interface includes a two-state push button control object (418), configured to receive a request from the user to expand the row. In this case, the two-state nature of the control object (418) is evidenced in how a first push of the button by the user expands the row while a second push of the button collapses the row.

Figure 4B:
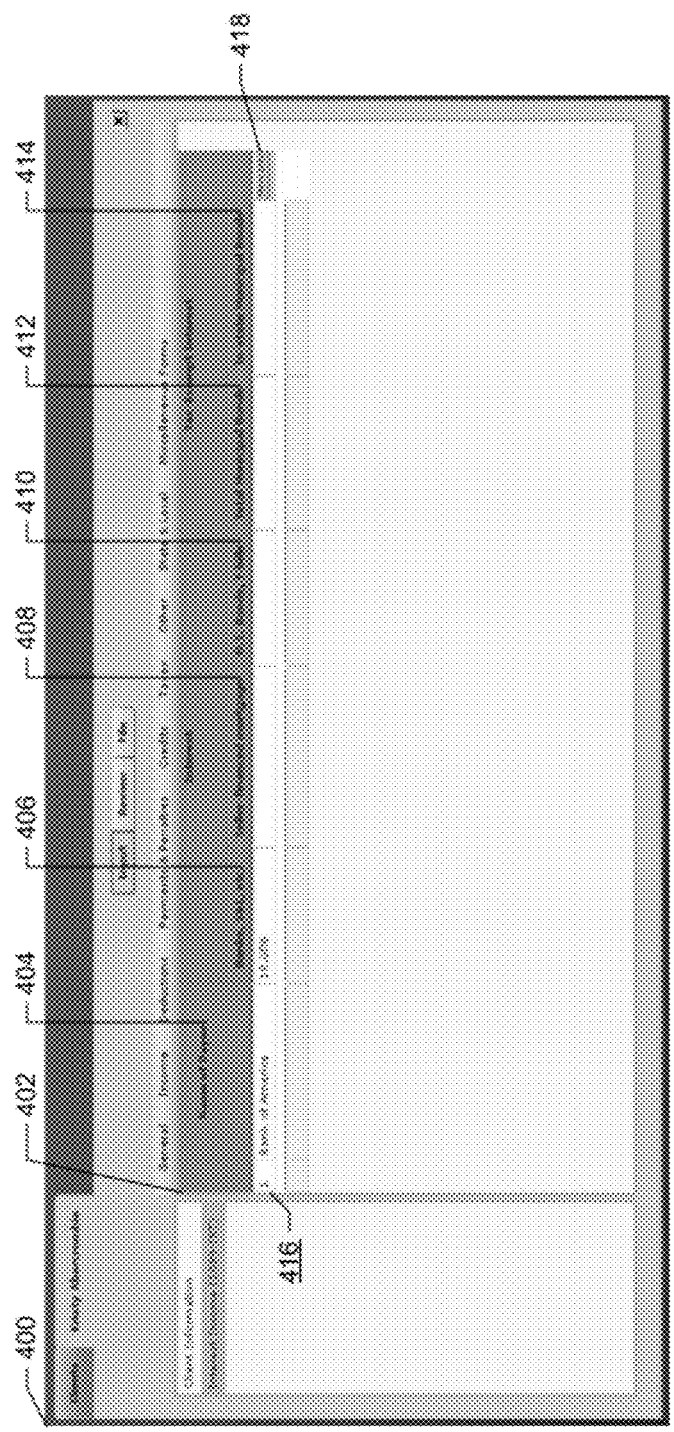
Figure 4C:
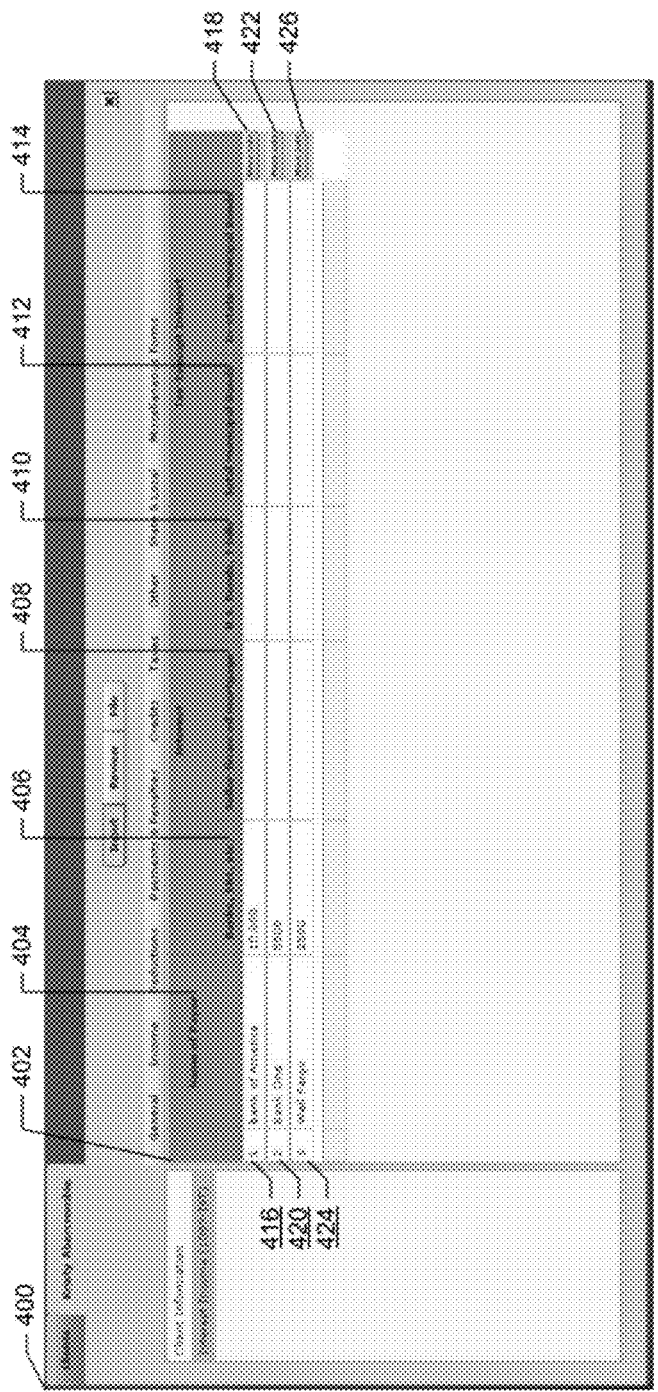

In FIG. 4b, the user has entered primary data into the first row (416): "Bank of America" for a "Name of Payer" (404); and "10,000" under "Interest"/"Banks, S&L, etc." (406). In FIG. 4c, the user has added two more data entries, as indicated by primary data entered in the newly-visible second and third rows (420, 424, respectively). Similar to the first row (416), the second and third rows (420, 424) are associated with accompanying push button control objects (422, 426, respectively).

Figure 4D:
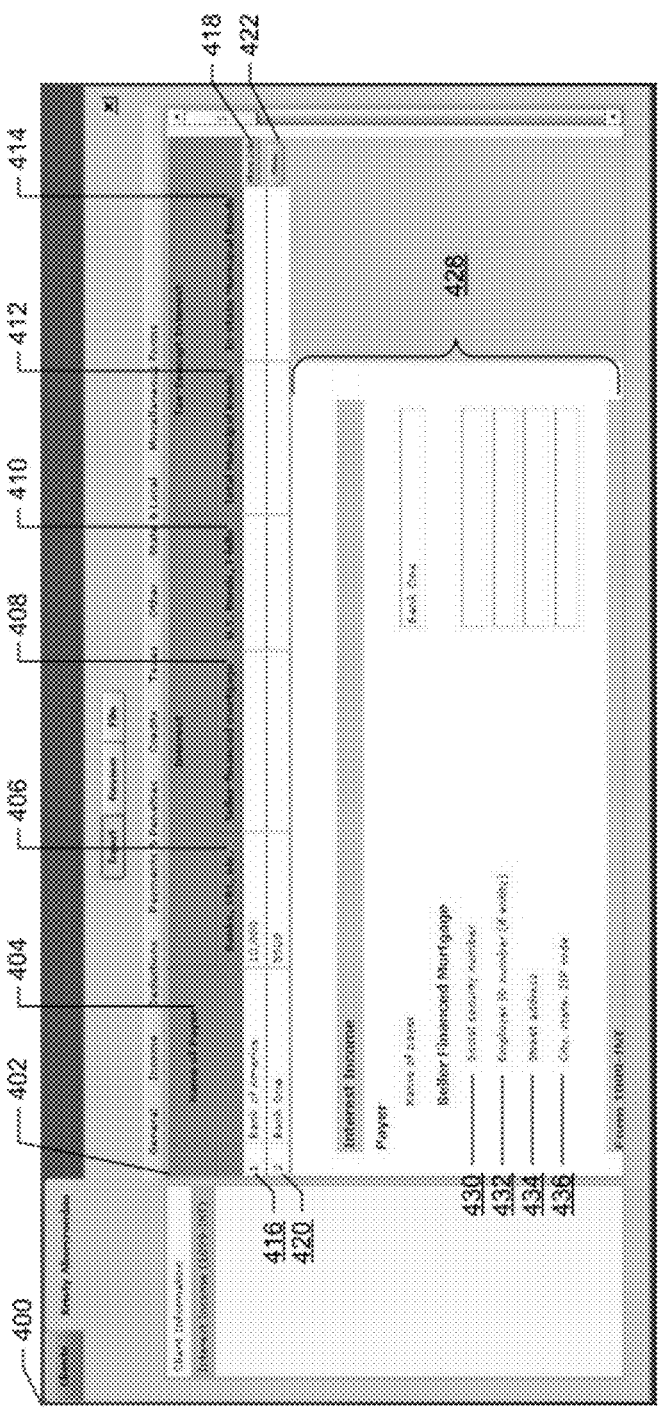

In FIG. 4d, the user has used the push button control object (422) of the second row to expand the second row (420). Accordingly, an input form (428) is displayed in association with the second row (420). The input form (428) includes fields for receiving and displaying supplementary data associated with the supplementary input variables.

For purposes of formatting the input form (428), and more specifically defining the fields (430-436) of the input form (428), the control module retrieved the supplementary input variables from the variable repository. In this case, fields are configured for, at least, the following supplementary input variables: "Social security number" (430); "Employer ID number (if entity)" (432); "Street address" (434); and "City, state, ZIP code" (436). Further, the push button control object (422) associated with the second row (420) is now configured to collapse the row (420) to hide the input form (428) upon receipt of a push input by the user.

Figure 4E:
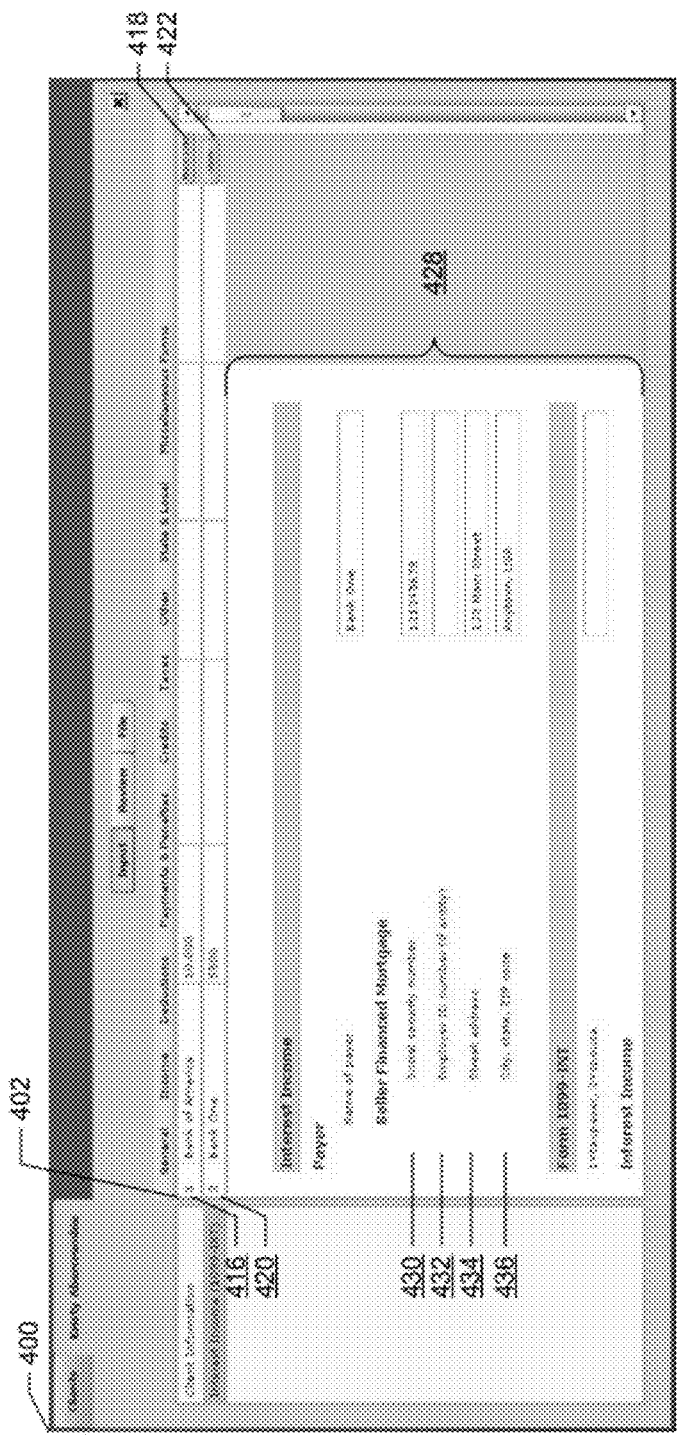
Figure 4F:
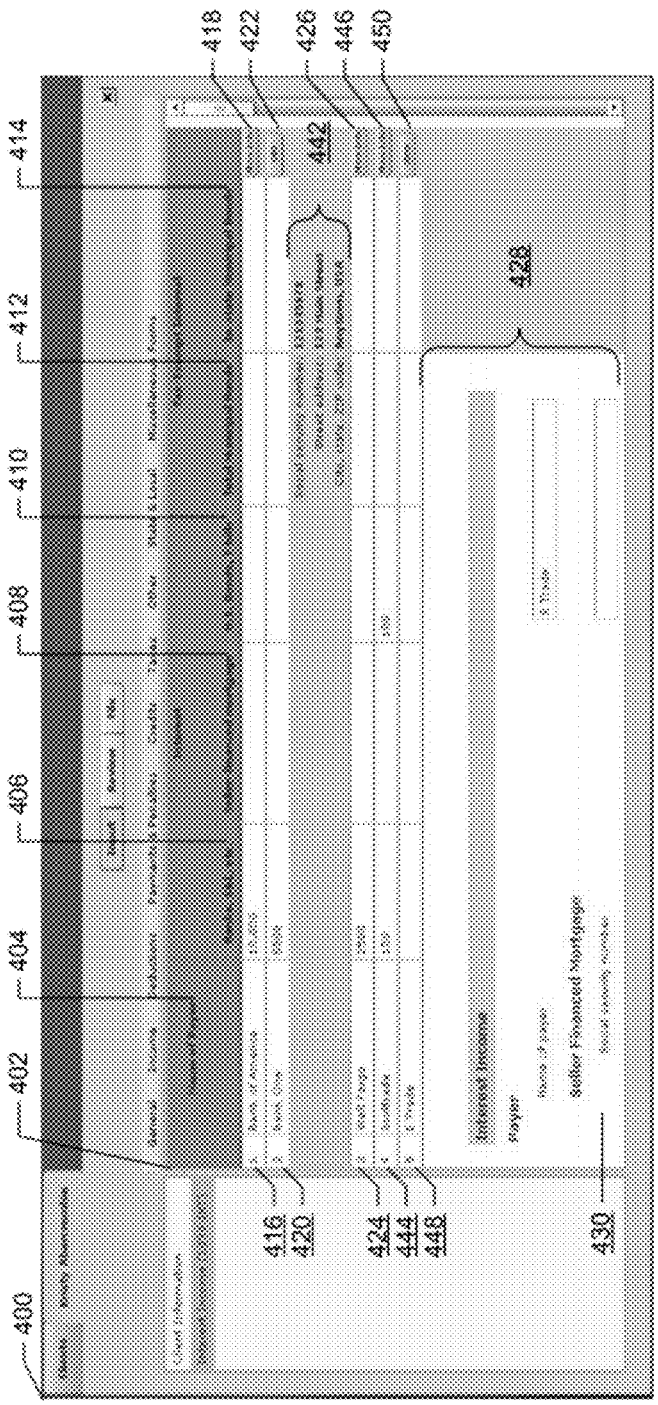

In FIG. 4e, the user has entered supplementary data for the second row entry (420) using the input form (428). In FIG. 4f, the user has used the push button control object (422) to collapse the second row (420). Accordingly, a summary (442) of the supplementary data associated with the second row (420) is displayed in association with the second row (420) in the input grid (402).

In addition, the user has used the push button control object (450) associated with the fifth row (448) to expand the row (448) and display the input form (428).

Together FIGS. 4d-4f illustrate at least one benefit of the invention. Specifically, data entered by the user, be it through the input grid (402) or the input form (428), is entered "in place." For example, FIGS. 4d and 4e show the expansion of the second row (420) to display the input form (428). It should be noted that the input form (428) is associated with the second row (420) to the extent that it is spatially placed in between the second row (420) and the third row (424) in the input grid (402). As such, supplementary data entered into the input form is associated with the second row entry (420) and its entry is spatially "in place" relative to the already-entered primary data of the second and third rows.

In using embodiments of the invention, a tax preparation professional may quickly and easily make numerous data entries using the input grid while still providing a wide breadth of data at their discretion using the input form. Owing to the layout of the input grid and the capability of expanding a row in the input grid to display an input form for the row, an additional benefit is that data entry additions or modifications for a particular row are made "in place" sequentially relative to the other data entries in the input grid.

Figure 5:
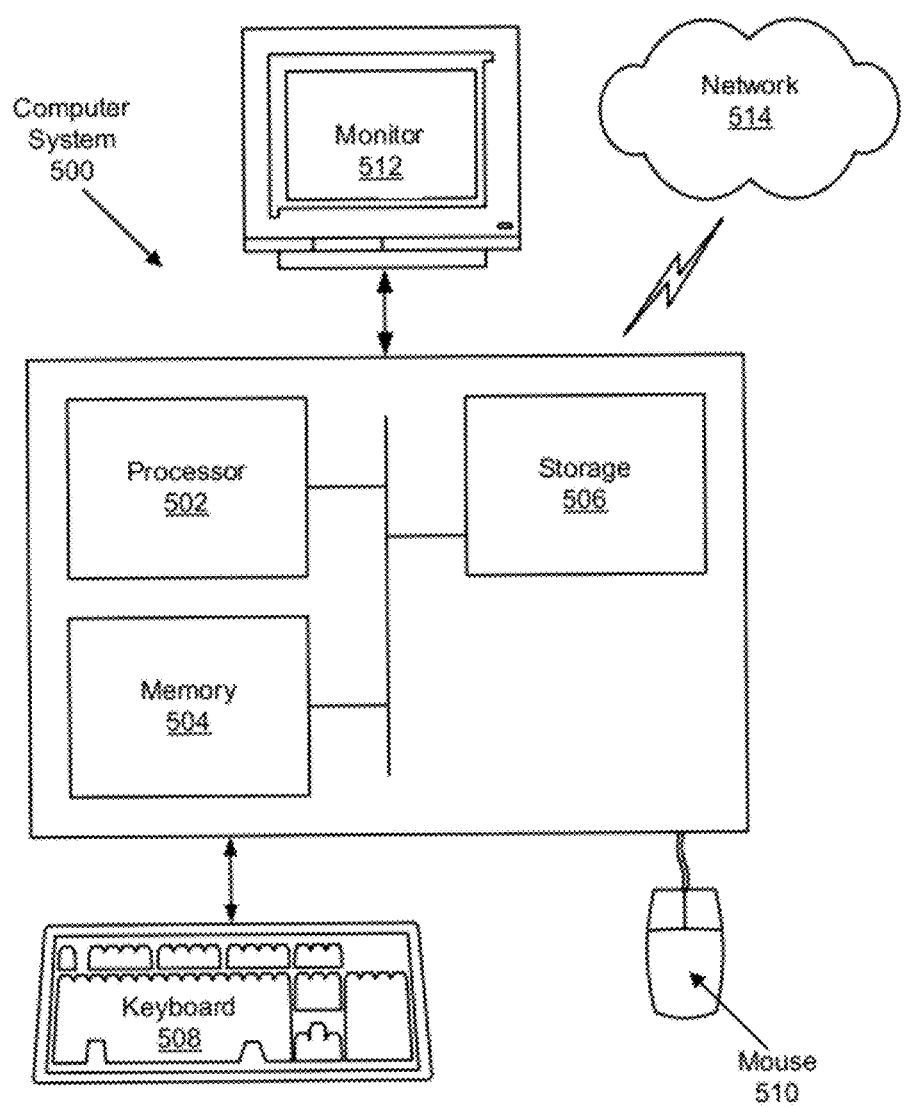
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processors (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining data from a user, comprising:

receiving, from the user, a first row selection in an input grid, wherein the input grid comprises at least one row and a plurality of columns, wherein each of the plurality of columns is associated with one of a plurality of primary input variables, and wherein each row is configured to display primary data corresponding with the plurality of primary input variables;

receiving, from the user, primary data for a first row corresponding with the first row selection;

storing the primary data after receiving the primary data from the user;

receiving, from the user, a request to expand the first row to display an input form, wherein the input form comprises a plurality of fields, wherein each of the plurality of fields is associated with one of a plurality of supplementary input variables, and wherein the plurality of fields are configured to display supplementary data corresponding with the plurality of supplementary input variables;

expanding, in response to the request to expand, the first row to display the input form;

receiving, from the user, the supplementary data within the input form;

storing the supplementary data after receiving the supplementary data from the user;

receiving, from the user, a request to collapse the first row to hide the input form, wherein the request is triggered by a selection of a button by the user;

collapsing response to the request to collapse, the first row to hide the input form;

generating a summary comprising the supplemental data; and displaying, below and in association with the first row, the summary comprising the supplementary data stored for the input form.

2. The method of claim 1, further comprising:
receiving from the user a second row selection in the input grid; and
obtaining and storing primary data for a second row corresponding with the second row selection from the user,
wherein the second row is spatially positioned after both the first row and the summary comprising the supplementary data in the input grid.

3. The method of claim 1, further comprising:
obtaining from an administrator the plurality of primary input variables and the plurality of supplementary input variables; and
storing the plurality of primary input variables and the plurality of supplementary input variables.

4. The method of claim 3, wherein the plurality of primary input variables changes over time based on the data entered by the user.

5. The method of claim 3, wherein the data represented in the summary comprising the supplementary data corresponds with only a subset of the plurality of supplementary input variables.

6. The method of claim 5, wherein the subset of the plurality of supplementary input variables is specified by the administrator.

7. The method of claim 1, further comprising:
retrieving the plurality of primary input variables and the plurality of supplementary input variables; and
creating the input grid using the plurality of primary input variables, wherein the input grid comprises at least one row and the plurality of columns.

8. The method of claim 1, wherein the plurality of primary input variables corresponds to data most commonly obtained from the user.

9. The method of claim 1, wherein the plurality of supplementary input variables corresponds to data less frequently obtained from the user.

10. A system for obtaining data from a user, comprising:
a computer processor;
a user interface executing on the computer processor and comprising:
an input grid, wherein the input grid comprises at least one row and a plurality of columns, wherein each of the plurality of columns is associated with one of a plurality of primary input variables, and wherein each row in the input grid is configured to display primary data corresponding with the plurality of primary input variables; and
an input form, wherein the input form comprises a plurality of fields, wherein each of the plurality of fields is associated with one of a plurality of supplementary input variables, and wherein the plurality of fields are configured to display supplementary data corresponding with the plurality of supplementary input variables;
wherein the user interface is configured to:
receive, from the user, a first row selection in the input grid;
receive, from the user, primary data for a first row corresponding with the first row selection;
receive, from the user, a request to expand the first row to display the input form;
expand, in response to the request to expand, the first row to display the input form;
receive, from the user, the supplementary data within the input form;
receive, from the user, a request to collapse the first row to hide the input form, wherein the request is triggered by a selection of a button by the user;
collapse, in response to the request to collapse, the first row to hide the input form;
generate a summary comprising the supplemental data; and
display, below and in association with the first row, the summary comprising the supplementary data obtained from the input form;
a variable repository configured to store the plurality of primary input variables and the plurality of supplementary input variables;
a data repository configured to store the primary data and the supplementary data obtained from the user; and
a control module configured to retrieve the plurality of primary input variables and the plurality of supplementary input variables from the variable repository, wherein the control module is further configured to create the input grid using the plurality of primary input variables and to create the input form using the plurality of supplementary input variables, and wherein the control module is further configured to route the primary data and the supplementary data from the user interface to the data repository.

11. The system of claim 10, wherein the user interface is further configured to:
receive, from the user, a second row selection in the input grid; and
obtain and store primary data for a second row corresponding with the second row selection from the user,
wherein the second row is sequentially positioned after both the first row and the summary comprising the supplementary data in the input grid.

12. The system of claim 10, further comprising:
an administrator interface configured to obtain from an administrator the plurality of primary input variables and the plurality of supplementary input variables,
wherein the control module is further configured to route the plurality of primary input variables and the plurality of supplementary input variables to the variable repository.

13. The system of claim 12, wherein the plurality of primary input variables changes over time based on the data entered by the user.

14. The system of claim 12, wherein the data represented in the summary comprising the supplementary data corresponds with only a subset of the plurality of supplementary input variables, and wherein the subset of the plurality of supplementary input variables is specified by the administrator using the administrator interface.

15. The system of claim 10, wherein the plurality of primary input variables corresponds to data most commonly obtained from the user.

16. The system of claim 10, wherein the plurality of supplementary input variables corresponds to data less frequently obtained from the user.

17. A non-transitory computer readable storage medium storing instructions for obtaining data from a user, the instructions executable on a computer processor and comprising functionality to:
obtain, from an administrator, a plurality of primary input variables and a plurality of supplementary input variables;

store the plurality of primary input variables and the plurality of supplementary input variables;
retrieve the plurality of primary input variables and the plurality of supplementary input variables;
create an input grid using the plurality of primary input variables, wherein the input grid comprises at least one row and a plurality of columns, wherein each of the plurality of columns is associated with one of the plurality of primary input variables, and wherein each row is configured to display primary data corresponding with the plurality of primary input variables;
receive, from the user, a first row selection in the input grid;
receive, from the user, primary data for a first row corresponding with the row selection;
store the primary data after receiving the primary data from the user;
receive, from the user, a request to expand the first row to display an input form, wherein the input form comprises a plurality of fields associated with one of the plurality of supplementary input variables, and wherein the plurality of fields are configured to display supplementary data corresponding with the plurality of supplementary input variables;
expand, in response to the request to expand, the first row to display the input form;
receive, from the user, supplementary data within the input form;
store the supplementary data after receiving the supplementary data from the user;
receive, from the user, a request to collapse the first row to hide the input form, wherein the request is triggered by a selection of a button by the user;
collapse, in response to the request to collapse, the first row to hide the input form;
generate a summary comprising the supplemental data; and
display, below and in association with the first row, the summary comprising the supplementary data stored for the input form.

18. The non-transitory computer readable storage medium of claim 17, the instructions further comprising functionality to:
receive, from the user, a second row selection in the input grid; and
obtain and store primary data for a second row corresponding with the second row selection from the user,
wherein the second row is sequentially positioned after both the first row and the summary comprising the supplementary data in the input grid.

19. The non-transitory computer readable storage medium of claim 17, wherein the plurality of primary input variables changes over time based on the data entered by the user.

20. The non-transitory computer readable storage medium of claim 17, wherein the data represented in the summary comprising the supplementary data corresponds with only a subset of the plurality of supplementary input variables.

21. The non-transitory computer readable storage medium of claim 20, wherein the subset of the plurality of supplementary input variables is specified by the administrator.

22. The non-transitory computer readable storage medium of claim 17, the instructions further comprising functionality to:
retrieve the plurality of primary input variables and the plurality of supplementary input variables; and
create the input grid using the plurality of primary input variables, wherein the input grid comprises at least one row and the plurality of columns.

23. The non-transitory computer readable storage medium of claim 17, wherein the plurality of primary input variables represents the data most commonly obtained from the user.

* * * * *